US012085495B2

(12) United States Patent
Chen et al.

(10) Patent No.: US 12,085,495 B2
(45) Date of Patent: Sep. 10, 2024

(54) CALCULATING MOLAR MASS VALUES OF COMPONENTS OF AND MOLAR MASS CONCENTRATION VALUES OF CONJUGATE MOLECULES/PARTICLES

(71) Applicant: Wyatt Technology, LLC, Goleta, CA (US)

(72) Inventors: Michelle H. Chen, Goleta, CA (US); Daniel I. Some, Atlit (IL)

(73) Assignee: Wyatt Technology, LLC, Goleta, CA (US)

(*) Notice: Subject to any disclaimer, the term of this patent is extended or adjusted under 35 U.S.C. 154(b) by 430 days.

(21) Appl. No.: 17/352,253

(22) Filed: Jun. 18, 2021

(65) Prior Publication Data

US 2021/0396642 A1  Dec. 23, 2021

Related U.S. Application Data

(60) Provisional application No. 63/041,110, filed on Jun. 18, 2020.

(51) Int. Cl.
*G01N 15/06* (2024.01)
*G01N 15/075* (2024.01)
*G01N 15/1434* (2024.01)

(52) U.S. Cl.
CPC ......... *G01N 15/06* (2013.01); *G01N 15/1434* (2013.01); *G01N 15/075* (2024.01)

(58) Field of Classification Search
CPC .... G01N 15/06; G01N 15/14; G01N 15/1434; G01N 2015/0693; G01N 15/1459; G01N 15/02; G01N 2015/0216; G01N 2015/0222; G01N 15/0211
See application file for complete search history.

(56) References Cited

U.S. PATENT DOCUMENTS

| | | | |
|---|---|---|---|
| 6,651,009 B1 | 11/2003 | Trainoff et al. | |
| 2007/0178013 A1* | 8/2007 | Kalonia | G01N 21/33 422/82.05 |
| 2008/0283754 A1 | 11/2008 | Nerin et al. | |
| 2009/0222219 A1 | 9/2009 | Some et al. | |
| 2012/0120388 A1 | 5/2012 | Harbers | |
| 2013/0308121 A1 | 11/2013 | Some et al. | |
| 2021/0396642 A1 | 12/2021 | Chen et al. | |

FOREIGN PATENT DOCUMENTS

| | | | | |
|---|---|---|---|---|
| WO | WO-2007016344 A1 * | 2/2007 | | G01N 35/08 |
| WO | WO-2021062164 A1 * | 4/2021 | | C12N 15/86 |

OTHER PUBLICATIONS

Chris C. Broomell, Characterization of Antibody-Drug Conjugates by SEC with Combined Light Scattering, dRI and UV Detection, Wyatt Technology Corporation, International Light Scattering Colloquium 2012 (Year: 2012).*
The Ultimate Guide, Buying a SEC-MALS Detector, Wyatt Technology Corporation, 2016 (Year: 2016).*
International Preliminary Report on Patentability in International Application No. PCT/US2022/034121, mailed on Dec. 28, 2023.
International Search Report and Written Opinion in International Application No. PCT/US2022/034121, mailed on Sep. 28, 2022.

* cited by examiner

*Primary Examiner* — Daniel R Miller
(74) *Attorney, Agent, or Firm* — Leonard P. Guzman

(57) ABSTRACT

The present disclosure describes a computer implemented method, a system, and a computer program product of calculating molar mass values of components of and molar concentration values of conjugate molecules/particles.

20 Claims, 12 Drawing Sheets

CALCULATING MOLAR MASS VALUES OF COMPONENTS OF AND MOLAR MASS CONCENTRATION VALUES OF CONJUGATE MOLECULES/PARTICLES

PRIORITY

This application claims priority to U.S. Provisional Patent Application No. 63/041,110, filed Jun. 18, 2020.

BACKGROUND

The present disclosure relates to conjugate molecules/particles, and more specifically, to calculating molar mass values of components of and molar concentration values of conjugate molecules/particles.

SUMMARY

The present disclosure describes a computer implemented method, a system, and a computer program product of calculating molar mass values of components of and molar concentration values of conjugate molecules/particles. The present disclosure describes a computer implemented method, a system, and a computer program product of calculating molar mass values of components of and molar concentration values of conjugate molecules/particles. In an exemplary embodiment, the computer implemented method, the system, and the computer program product include (1) receiving, by a computer system, ΔRI values from a differential refractive index (dRI) detector, ΔUV values from a wavelength absorption (UV) detector, and reduced Rayleigh ratio, R(θ), values from a static light scattering (SLS) instrument, for non-wavelength absorbing molecules/particles, where the non-wavelength absorbing molecules/particles range in size from a lower size limit to an upper size limit and are separated according to size by a separation device, (2) calculating, by the computer system, apparent scattering extinction coefficient values of the non-wavelength absorbing molecules/particles, sEC, and molar mass values of the non-wavelength absorbing molecules/particles, M, with respect to the ΔRI values, the ΔUV values, and the R(θ) values, and (3) executing, by the computer system, a set of logical operations fitting the sEC values and the M values to a fit equation, resulting in a correlation between the sEC values and the M values, resulting in a fit function, sEC=f(M), for the non-wavelength absorbing molecules/particles.

DETAILED DESCRIPTION

Figure 1A:
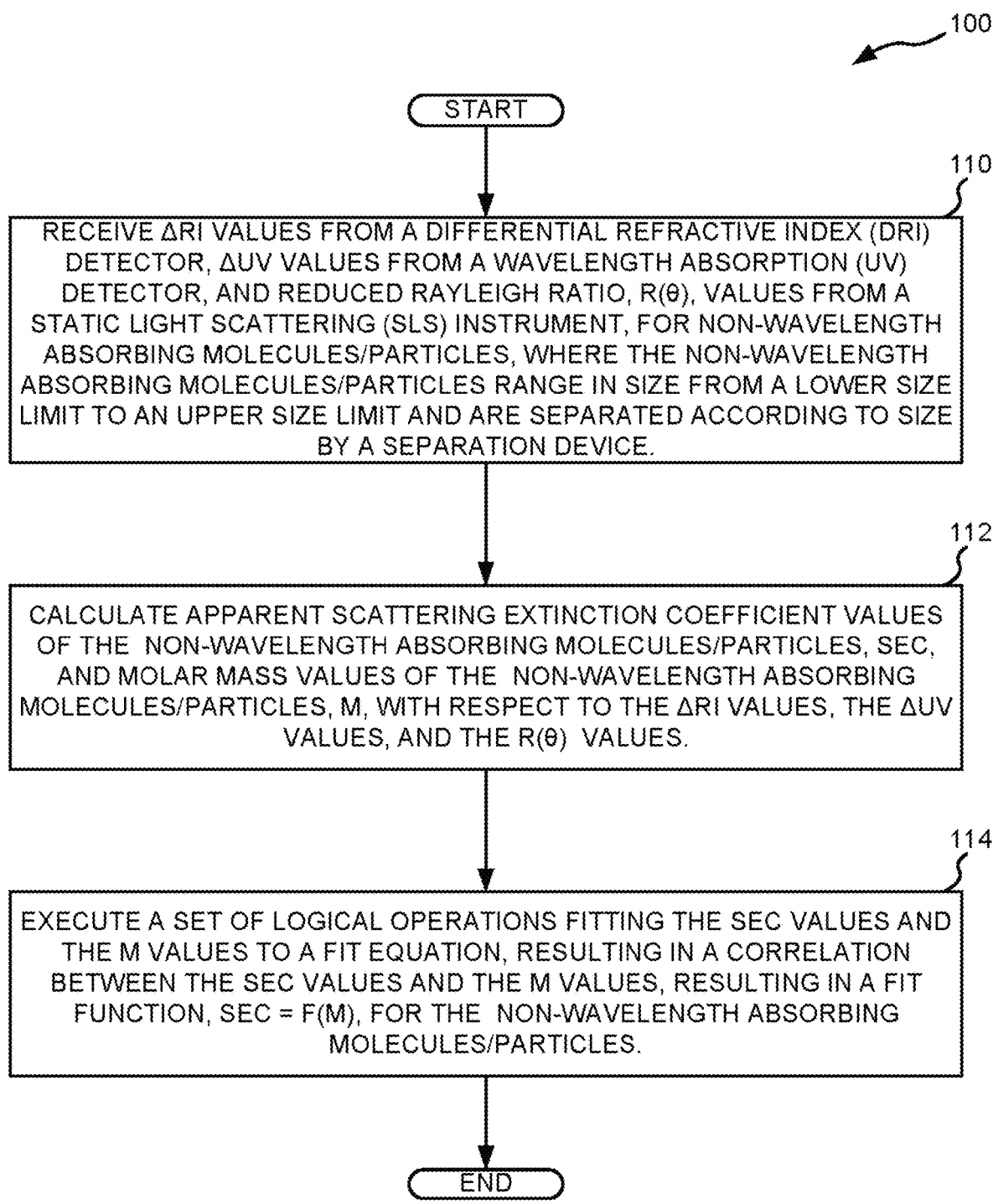
FIG. 1A depicts a flowchart in accordance with an exemplary embodiment.

The present disclosure describes a computer implemented method, a system, and a computer program product of calculating molar mass values of components of and molar concentration values of conjugate molecules/particles. In an exemplary embodiment, the computer implemented method, the system, and the computer program product include (1) receiving, by a computer system, ΔRI values from a differential refractive index (dRI) detector, ΔUV values from a wavelength absorption (UV) detector, and reduced Rayleigh ratio, R(θ), values from a static light scattering (SLS) instrument, for non-wavelength absorbing molecules/particles, where the non-wavelength absorbing molecules/particles range in size from a lower size limit to an upper size limit and are separated according to size by a separation device, (2) calculating, by the computer system, apparent scattering extinction coefficient values of the non-wavelength absorbing molecules/particles, sEC, and molar mass values of the non-wavelength absorbing molecules/particles, M, with respect to the ΔRI values, the ΔUV values, and the R(θ) values, and (3) executing, by the computer system, a set of logical operations fitting the sEC values and the M values to a fit equation, resulting in a correlation between the sEC values and the M values, resulting in a fit function, sEC=f(M), for the non-wavelength absorbing molecules/particles. In an embodiment, measurements from the SLS instrument and the dRI detector are used to determine M values, while measurements from the UV detector and the dRI detector are used to determine sEC values. For example, the SLS could be a multi-angle static light scattering (MALS) instrument for typical high molecular weight (MW) conjugate molecules/particles, such as lipid nanoparticles. In an embodiment, the non-wavelength absorbing molecules/particles are separated by size according to radius or molecular weight by a separation device, such as a field flow fractionator (FFF) or a size exclusion chromatography system.

In a further embodiment, the computer implemented method, the system, and the computer program product further include storing, by the computer system, the fit function in a data store. In an embodiment, the fit equation is one of $$f(M)=(A \times M^2)+(B \times M),$$

$$f(M)=(A \times M)+B, \text{ and}$$

a polynomial of the form $$f(M)=A_0+(A_1 \times M)+(A_2 \times M^2)+(A_3 \times M^3)+ \ldots +(A_n \times M^n),$$

where A is a first fit constant relating to the correlation and B is a second fit constant relating to the correlation, where $A_0, A_1, A_2, A_3, \ldots A_n$ are fit constants relating to the correlation.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

Concentration Detector

Differential Refractive Index Detector

A differential refractive index detector (dRI), or differential refractometer, or refractive index detector (RI or RID), is a detector that measures the refractive index of an analyte relative to the solvent. They are often used as detectors for high-performance liquid chromatography and size exclusion chromatography. dRIs are considered to be universal detectors because they can detect anything with a refractive index different from the solvent, but they have low sensitivity. When light leaves one material and enters another it bends, or refracts. The refractive index of a material is a measure of how much light bends when it enters.

A differential refractive index detector contain a flow cell with the following two parts: one for the sample; and one for the reference solvent. The dRI measures the refractive index of both components. When only solvent is passing through the sample component, the measured refractive index of both components is the same, but when an analyte passes through the flow cell, the two measured refractive indices are different. The difference appears as a peak in the chromatogram. Differential refractive index detectors are often used for the analysis of polymer samples in size exclusion chromatography. A dRI could output a concentration detector signal value corresponding to a concentration value of a sample.

Ultraviolet-Visible Spectroscopy

Ultraviolet-visible spectroscopy or ultraviolet-visible spectrophotometry (UV-Vis or UV/Vis) refers to absorption spectroscopy or reflectance spectroscopy in the ultraviolet-visible spectral region. An ultraviolet-visible detector/ultraviolet-visible spectrophotometer uses light in the visible and adjacent ranges, where the absorption or reflectance in the visible range directly affects the perceived color of the chemicals involved, where in this region of the electromagnetic spectrum, atoms and molecules undergo electronic transitions. Such absorption spectroscopy measures transitions from the ground state to the excited state. An ultraviolet-visible detector/ultraviolet-visible spectrophotometer measures the intensity of light passing through a sample (I), and compares it to the intensity of light before it passes through the sample ($I_o$), where the ratio $I/I_o$ is called the transmittance, and is usually expressed as a percentage (% T). The absorbance, A, is based on the transmittance according to $$A = -\log(\% T/100\%).$$

The UV-visible spectrophotometer can also be configured to measure reflectance, where the spectrophotometer measures the intensity of light reflected from a sample (I), and compares it to the intensity of light reflected from a reference material ($I_o$), where the ratio $I/I_o$ is called the reflectance, and is usually expressed as a percentage (% R). An ultraviolet absorption detector could output a concentration detector signal value corresponding to a concentration value of a sample.

There is a need to calculate molar mass values of components of and molar concentration values of conjugate molecules/particles.

Referring to FIG. 1A, in an exemplary embodiment, the computer implemented method, the system, and the computer program product are configured to perform an operation 110 of receiving, by a computer system, ΔRI values from a differential refractive index (dRI) detector, ΔUV values from a wavelength absorption (UV) detector, and reduced Rayleigh ratio, R(θ), values from a static light scattering (SLS) instrument, for non-wavelength absorbing molecules/particles, where the non-wavelength absorbing molecules/particles range in size from a lower size limit to an upper size limit and are separated according to size by a separation device, an operation 112 of calculating, by the computer system, apparent scattering extinction coefficient values of the non-wavelength absorbing molecules/particles, sEC, and molar mass values of the non-wavelength absorbing molecules/particles, M, with respect to the ΔRI values, the ΔUV values, and the R(θ) values, and an operation 114 of executing, by the computer system, a set of logical operations fitting the sEC values and the M values to a fit equation, resulting in a correlation between the sEC values and the M values, resulting in a fit function, sEC=f(M), for the non-wavelength absorbing molecules/particles.

Figure 6:
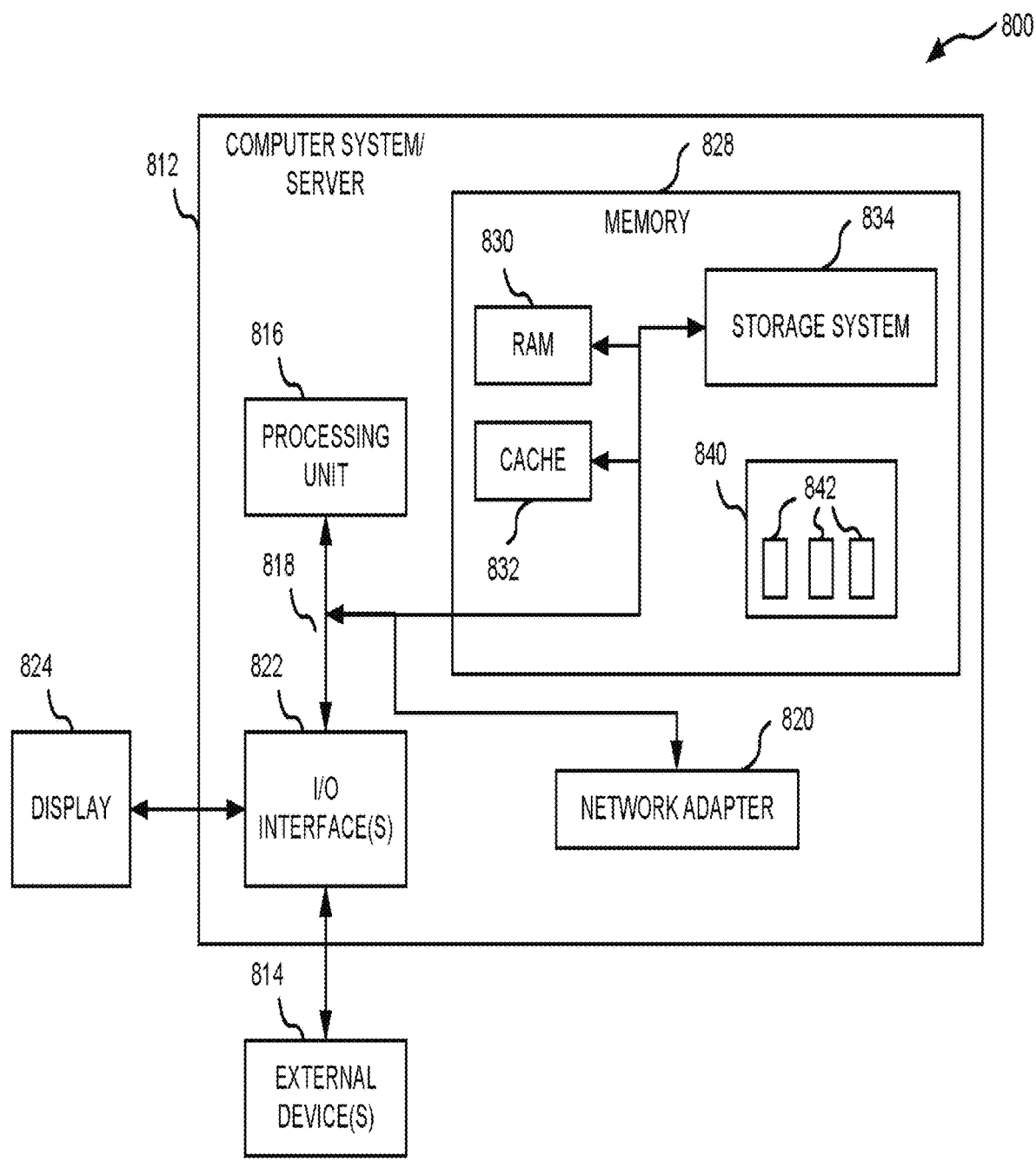
FIG. 6 depicts a computer system in accordance with an exemplary embodiment.

In an exemplary embodiment, the computer system is a standalone computer system, such as computer system 800 shown in FIG. 6, a network of distributed computers, where at least some of the computers are computer systems such as computer system 800 shown in FIG. 6, or a cloud computing node server, such as computer system 800 shown in FIG. 6. In an embodiment, the computer system is a computer system 800 as shown in FIG. 6, that executes a calculating molar mass values of components of and molar concentration values of conjugate molecules/particles script or computer software application that carries out the operations of at least method 100. In an embodiment, the computer system is a computer system/server 812 as shown in FIG. 6, that executes a calculating molar mass values of components of and molar concentration values of conjugate molecules/particles script or computer software application that carries out the operations of at least method 100. In an embodiment, the computer system is a processing unit 816 as shown in FIG. 6, that executes a calculating molar mass values of components of and molar concentration values of conjugate molecules/particles script or computer software application that carries out the operations of at least method 100. In an embodiment, the computer system is a processor of the analytical instrument, that executes a calculating molar mass values of components of and molar concentration values of conjugate molecules/particles script or computer software application that carries out the operations of at least method 100.

In an embodiment, the computer system is a computer system 800 as shown in FIG. 6, that executes a calculating molar mass values of components of and molar concentration values of conjugate molecules/particles script or computer software application that carries out at least operations 110, 112, and 114. In an embodiment, the computer system is a computer system/server 812 as shown in FIG. 6, that executes a calculating molar mass values of components of and molar concentration values of conjugate molecules/particles script or computer software application that carries out at least operations 110, 112, and 114. In an embodiment, the computer system is a processing unit 816 as shown in FIG. 6, that a calculating molar mass values of components of and molar concentration values of conjugate molecules/particles script or computer software application that carries out at least operations 110, 112, and 114.

Figure 1B:
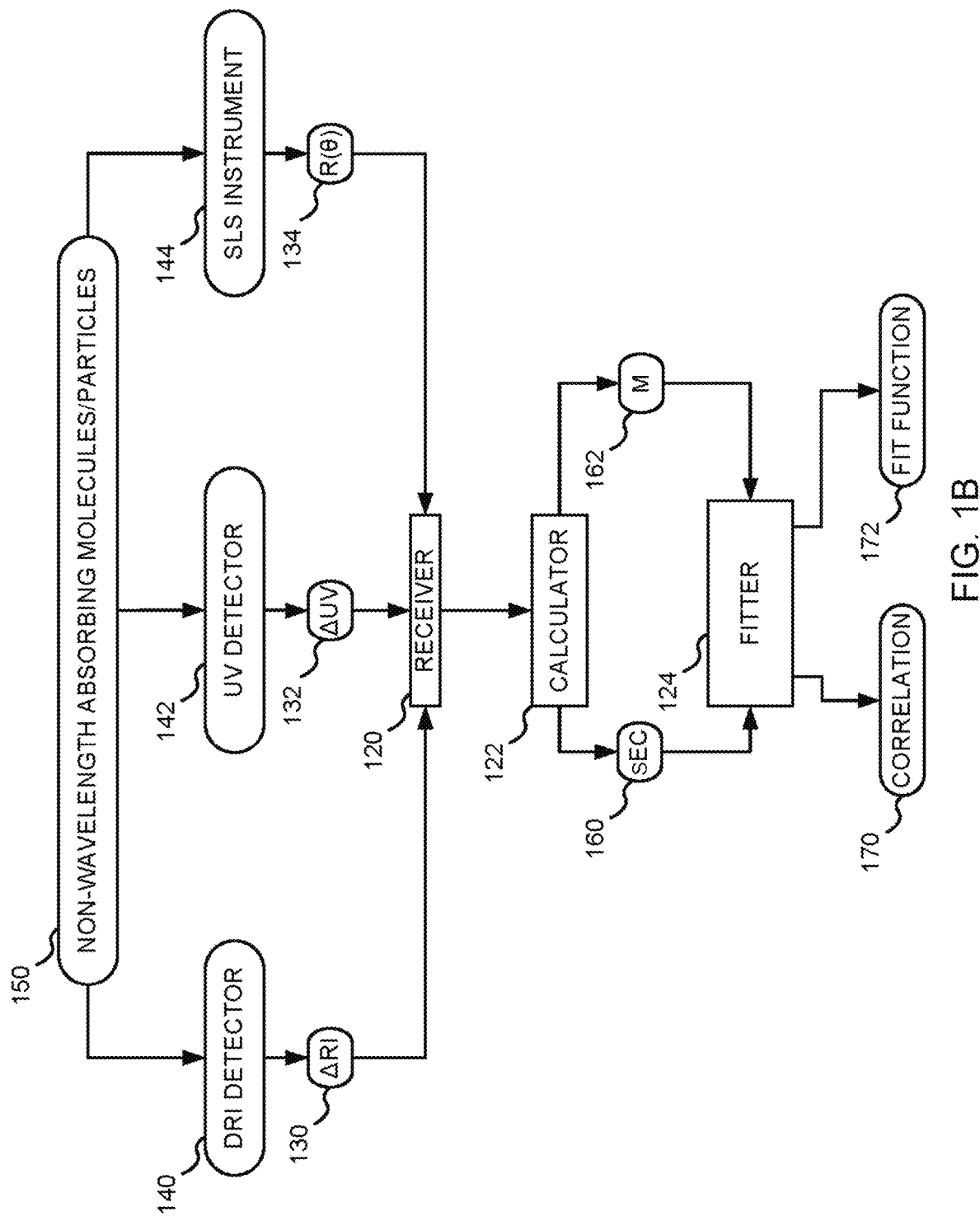
FIG. 1B depicts a block diagram in accordance with an exemplary embodiment.

Referring to FIG. 1B, in an exemplary embodiment, the computer implemented method, the system, and the computer program product include a receiver 120, a calculator 122, and a fitter 124. In an embodiment, receiver 120 is configured to receive ΔRI values 130 from a differential refractive index (dRI) detector 140, ΔUV values 132 from a wavelength absorption (UV) detector 142, and reduced Rayleigh ratio, R(θ), values 134 from a static light scattering (SLS) instrument 144, for non-wavelength absorbing molecules/particles 146, where non-wavelength absorbing molecules/particles 146 range in size from a lower size limit to an upper size limit and are separated according to size by a separation device. In an embodiment, receiver 120 includes a computer system, such as computer system 800 as shown in FIG. 6, performing operation 110. In an embodiment, receiver 120 includes a computer system, such as computer system/server 812 as shown in FIG. 6, performing operation 110. In an embodiment, receiver 120 includes a computer system, such as processing unit 816 as shown in FIG. 6, performing operation 110. In an embodiment, receiver 120 is implemented as computer software executing on a computer system, such as computer system 800 as shown in FIG. 6, such that the computer system performs operation 110. In an embodiment, receiver 120 is implemented as computer software executing on a computer system, such as computer system/server 812 as shown in FIG. 6, such that the computer system performs operation 110. In an embodiment, receiver 120 is implemented as computer software executing on a computer system, such as processing unit 816 as shown in FIG. 6, such that the computer system performs operation 110. In an embodiment, receiver 120 performs operation 110 as computer software executing on a processor of receiver 120.

In an embodiment, calculator 122 is configured to calculate apparent scattering extinction coefficient values 160 of non-wavelength absorbing molecules/particles 150, sEC, and molar mass values 162 of non-wavelength absorbing molecules/particles 150, M, with respect to ΔRI values 130, ΔUV values 132, and R(θ) values 134. In an embodiment, calculator 122 includes a computer system, such as computer system 800 as shown in FIG. 6, performing operation 112. In an embodiment, calculator 122 includes a computer system, such as computer system/server 812 as shown in FIG. 6, performing operation 112. In an embodiment, calculator 122 includes a computer system, such as processing unit 816 as shown in FIG. 6, performing operation 112. In an embodiment, calculator 122 is implemented as computer software executing on a computer system, such as computer system 800 as shown in FIG. 6, such that the computer system performs operation 112. In an embodiment, calculator 122 is implemented as computer software executing on a computer system, such as computer system/server 812 as shown in FIG. 6, such that the computer system performs operation 112. In an embodiment, calculator 122 is implemented as computer software executing on a computer system, such as processing unit 816 as shown in FIG. 6, such that the computer system performs operation 112. In an embodiment, calculator 122 performs operation 112 as computer software executing on a processor of calculator 122.

In an embodiment, fitter 124 is configured to execute a set of logical operations fitting sEC values 160 and M values 162 to a fit equation, resulting in a correlation 170 between sEC values 160 and M values 162, resulting in a fit function 172, sEC=f(M), for non-wavelength absorbing molecules/particles 150. In an embodiment, fitter 124 includes a computer system, such as computer system 800 as shown in FIG. 6, performing operation 114. In an embodiment, fitter 124 a computer system, such as computer system/server 812 as shown in FIG. 6, performing operation 114. In an embodiment, fitter 124 includes a computer system, such as processing unit 816 as shown in FIG. 6, performing operation 114. In an embodiment, fitter 124 is implemented as computer software executing on a computer system, such as computer system 800 as shown in FIG. 6, such that the computer system performs operation 114. In an embodiment, fitter 124 is implemented as computer software executing on a computer system, such as computer system/server 812 as shown in FIG. 6, such that the computer system performs operation 114. In an embodiment, fitter 124 is implemented as computer software executing on a computer system, such as processing unit 816 as shown in FIG. 6, such that the computer system performs operation 114. In an embodiment, fitter 124 performs operation 114 as computer software executing on a processor of fitter 124.

Calculating Molar Mass Values and Molar Concentration Values

In a further embodiment, the computer implemented method, the system, and the computer program product further include (a) receiving, by the computer system, from a second dRI detector second ΔRI values for conjugate molecules/particles with respect to a solvent containing the conjugate molecules/particles, where the conjugate molecules/particles include wavelength absorbing components and non-wavelength absorbing components and are separated according to size by a second separation device, (b) receiving, by the computer system, from a second wavelength absorption detector second ΔUV values for the conjugate molecules/particles, (c) receiving, by the computer system, from a second SLS instrument second reduced Rayleigh ratio, R(θ), values with respect to the conjugate molecules/particles and the solvent, (d) receiving, by the computer system, a dn/dc value for the wavelength absorbing components, $dn/dc_1$, and a dn/dc value for the non-wavelength absorbing components, $dn/dc_2$, from a dn/dc data source, (e) receiving, by the computer system, an absorbing extinction coefficient (aEC) value for the wavelength absorbing components, $\alpha_1$, from an aEC data source, (f) receiving, by the computer system, a scattering correction factor value for the wavelength absorbing components, D, from a D data source, and (g) executing, by the computer system, a set of logical operations performing conjugate analysis on the second ΔRI values, the second ΔUV values, the second R(θ) values, the $dn/dc_1$ value, the $dn/dc_2$ value, the $\alpha_1$ value, and the D value, with respect to the fit function, sEC=f(M), resulting in molar mass values of the wavelength absorbing components, $M_1$, molar mass values of the non-wavelength absorbing components, $M_2$, and molar concentration values of the conjugate molecules/particles, [conj]. In an embodiment, the conjugate molecules/particles are separated by size according to radius or molecular weight by a separation device, such as a field flow fractionator (FFF) or a size exclusion chromatography system. In an embodiment, the second dRI detector is dRI detector 140. In an embodiment, the second UV detector is UV detector 142. In an embodiment, the second SLS instrument is SLS instrument 144. For example, the second SLS could be a MALS instrument for typical high MW conjugate molecules/particles, such as lipid nanoparticles.

In an embodiment, the dn/dc data source is at least one of a user input, a database, and a data storage device. In an embodiment, the aEC data source is at least one of a user input, a database, and a data storage device. In an embodiment, the D data source is at least one of a user input, a database, and a data storage device.

Figure 2:
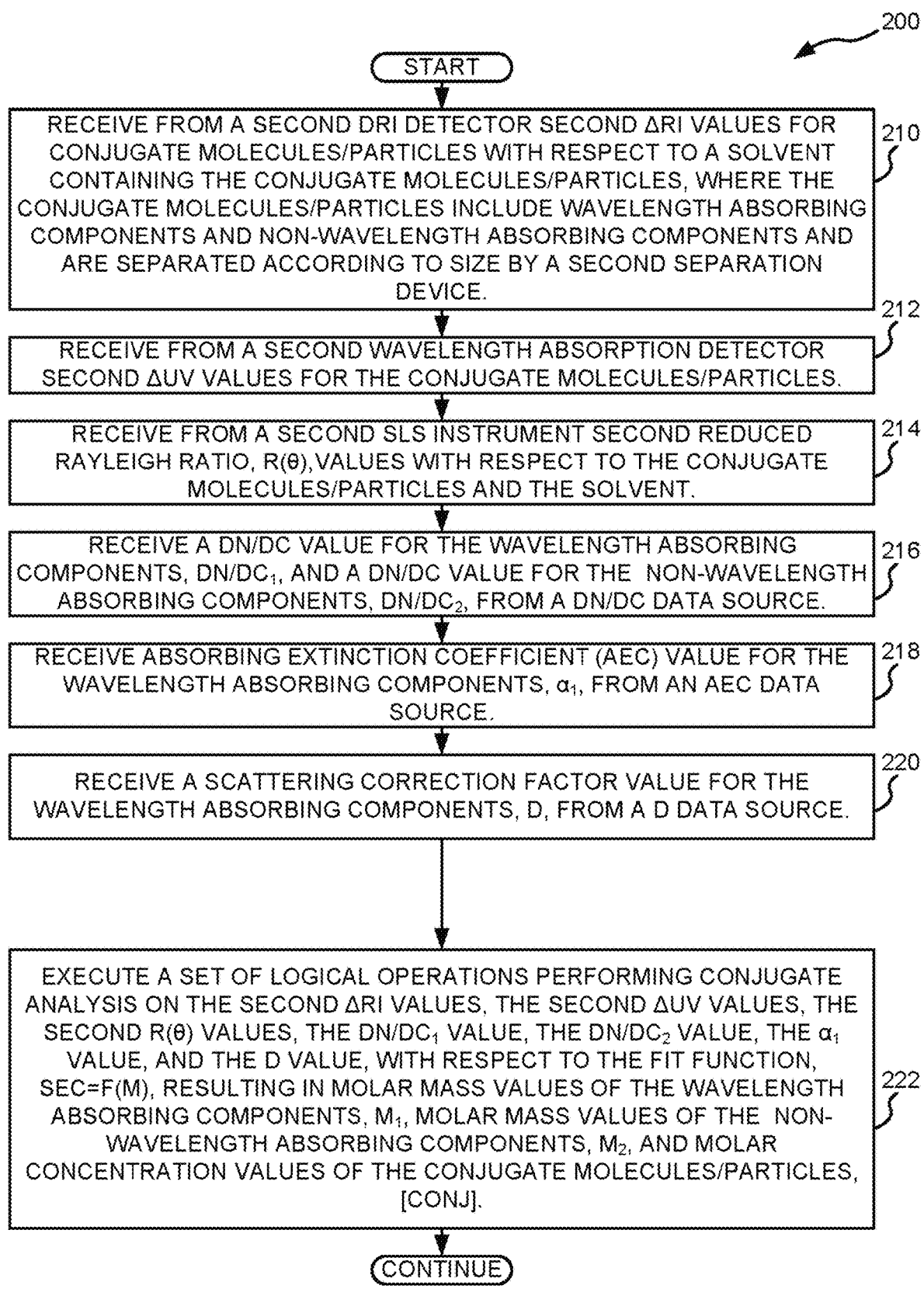
FIG. 2 depicts a flowchart in accordance with an embodiment.

Referring to FIG. 2, the computer implemented method, the system, and the computer program product are further configured to perform an operation 210 of receiving, by the computer system, from a second dRI detector second ΔRI values for conjugate molecules/particles with respect to a solvent containing the conjugate molecules/particles, where the conjugate molecules/particles include wavelength absorbing components and non-wavelength absorbing components and are separated according to size by a second separation device, an operation 212 of receiving, by the computer system, from a second wavelength absorption detector second ΔUV values for the conjugate molecules/particles, an operation 214 of receiving, by the computer system, from a second SLS instrument second reduced Rayleigh ratio, R(θ), values with respect to the conjugate molecules/particles and the solvent, an operation 216 of receiving, by the computer system, a dn/dc value for the wavelength absorbing components, $dn/dc_1$, and a dn/dc value for the non-wavelength absorbing components, $dn/dc_2$, from a dn/dc data source, an operation 218 of receiving, by the computer system, an absorbing extinction coefficient (aEC) value for the wavelength absorbing components, $\alpha_1$, from an aEC data source, an operation 220 of receiving, by the computer system, a scattering correction factor value for the wavelength absorbing components, D, from a D data source, and an operation 222 of executing, by the computer system, a set of logical operations performing conjugate analysis on the second ΔRI values, the second ΔUV values, the second R(θ) values, the $dn/dc_1$ value, the $dn/dc_2$ value, the $\alpha_1$ value, and the D value, with respect to the fit function, sEC=f(M), resulting in molar mass values of the wavelength absorbing components, $M_1$, molar mass values of the non-wavelength absorbing components, $M_2$, and molar concentration values of the conjugate molecules/particles, [conj].

In an embodiment, the computer system is a computer system 800 as shown in FIG. 6, that executes a calculating molar mass values of components of and molar concentration values of conjugate molecules/particles script or computer software application that carries out the operations of at least method 200. In an embodiment, the computer system is a computer system/server 812 as shown in FIG. 6, that executes a calculating molar mass values of components of and molar concentration values of conjugate molecules/particles script or computer software application that carries out the operations of at least method 200. In an embodiment, the computer system is a processing unit 816 as shown in FIG. 6, that executes a calculating molar mass values of components of and molar concentration values of conjugate molecules/particles script or computer software application that carries out the operations of at least method 200. In an embodiment, the computer system is a processor of the analytical instrument, that executes a calculating molar mass values of components of and molar concentration values of conjugate molecules/particles script or computer software application that carries out the operations of at least method 200.

In an embodiment, the computer system is a computer system 800 as shown in FIG. 6, that executes a calculating molar mass values of components of and molar concentration values of conjugate molecules/particles script or computer software application that carries out at least operations 210, 212, 214, 216, 218, 220, and 222. In an embodiment, the computer system is a computer system/server 812 as shown in FIG. 6, that executes a calculating molar mass values of components of and molar concentration values of conjugate molecules/particles script or computer software application that carries out at least operations 210, 212, 214, 216, 218, 220, and 222. In an embodiment, the computer system is a processing unit 816 as shown in FIG. 6, that a calculating molar mass values of components of and molar concentration values of conjugate molecules/particles script or computer software application that carries out at least operations 210, 212, 214, 216, 218, 220, and 222.

Performing Conjugate Analysis

In an embodiment, performing conjugate analysis includes executing, by the computer system, a set of logical operations solving conjugate analysis equations in a simultaneous manner with respect to the second $\Delta RI$ values, the second $\Delta UV$ values, the second $R(\theta)$ values, the $dn/dc_1$ value, the $dn/dc_2$ value, the $\alpha_1$ value, the D value, and the fit function, sEC=f(M), where f(M)=f($M_1$+$M_2$), resulting in the $M_1$ values, the $M_2$ values, and the [conj] values, where the conjugate analysis equations include $$\Delta RI = \left(\frac{dn}{dc_1}\right)c_1 + \left(\frac{dn}{dc_2}\right)c_2,$$

$$\Delta UV = ((\alpha_1 + \varepsilon_1)c_1 + \varepsilon_2 c_2)l,$$

$$\varepsilon_1 = f(M_1 + M_2) \times D,$$

$$\varepsilon_2 = f(M_1 + M_2),$$

$$c_1 = M_1[conj],$$

$$c_2 = M_2[conj], \text{ and}$$

$$R(\theta) = K\left[M_1\left(\frac{dn}{dc_1}\right) + M_2\left(\frac{dn}{dc_2}\right)\right]^2 [conj]P(\theta),$$

where $c_1$ and $\varepsilon_1$, a sEC value, correspond to the wavelength absorbing components, $c_2$ and $\varepsilon_2$, a sEC value, correspond to the non-wavelength absorbing components, l is a path length in the second wavelength absorption detector, K is an optical constant of the second SLS instrument with respect to the solvent, $\theta$ is a scattering angle of a detector in the second SLS instrument, and $P(\theta)$ is a scattering form factor of the conjugate molecules/particles.

In an embodiment, the computer implemented method, the system, and the computer program product are configured to perform an operation of executing, by the computer system, a set of logical operations solving conjugate analysis equations in a simultaneous manner with respect to the second $\Delta RI$ values, the second $\Delta UV$ values, the second $R(\theta)$ values, the $dn/dc_1$ value, the $dn/dc_2$ value, the $\alpha_1$ value, the D value, and the fit function, sEC=f(M), where f(M)=f($M_1$+$M_2$), resulting in the $M_1$ values, the $M_2$ values, and the [conj] values, where the conjugate analysis equations include $$\Delta RI = \left(\frac{dn}{dc_1}\right)c_1 + \left(\frac{dn}{dc_2}\right)c_2,$$

$$\Delta UV = ((\alpha_1 + \varepsilon_1)c_1 + \varepsilon_2 c_2)l,$$

$$\varepsilon_1 = f(M_1 + M_2) \times D,$$

$$\varepsilon_2 = f(M_1 + M_2),$$

$$c_1 = M_1[conj],$$

$$c_2 = M_2[conj], \text{ and}$$

$$R(\theta) = K\left[M_1\left(\frac{dn}{dc_1}\right) + M_2\left(\frac{dn}{dc_2}\right)\right]^2 [conj]P(\theta),$$

where $c_1$ and $\varepsilon_1$, a sEC value, correspond to the wavelength absorbing components, $c_2$ and $\varepsilon_2$, a sEC value, correspond to the non-wavelength absorbing components, l is a path length in the second wavelength absorption detector, K is an optical constant of the second SLS instrument with respect to the solvent, $\theta$ is a scattering angle of a detector in the second SLS instrument, and $P(\theta)$ is a scattering form factor of the conjugate molecules/particles.

Displaying Results

In a further embodiment, the computer implemented method, the system, and the computer program product further include (a) receiving, by the computer system, from a light scattering (LS) instrument LS measurement values for the conjugate molecules/particles, where the LS measurement values are one of dynamic light scattering (DLS) measurement values from a DLS instrument and SLS measurement values from the second SLS instrument, and (b) calculating, by the computer system, radii values of the conjugate molecules/particles with respect to the LS measurement values. In an embodiment, the second SLS instrument is a MALS instrument.

In an embodiment, the computer implemented method, the system, and the computer program product are configured to perform an operation of receiving, by the computer system, from a light scattering (LS) instrument LS measurement values for the conjugate molecules/particles, where the LS measurement values are one of dynamic light scattering (DLS) measurement values from a DLS instrument and SLS measurement values from the second SLS instrument, and an operation of calculating, by the computer system, radii values of the conjugate molecules/particles with respect to the LS measurement values. In an embodiment, the second SLS instrument is a MALS instrument.

Displaying $M_1$ Values

Figure 3A:
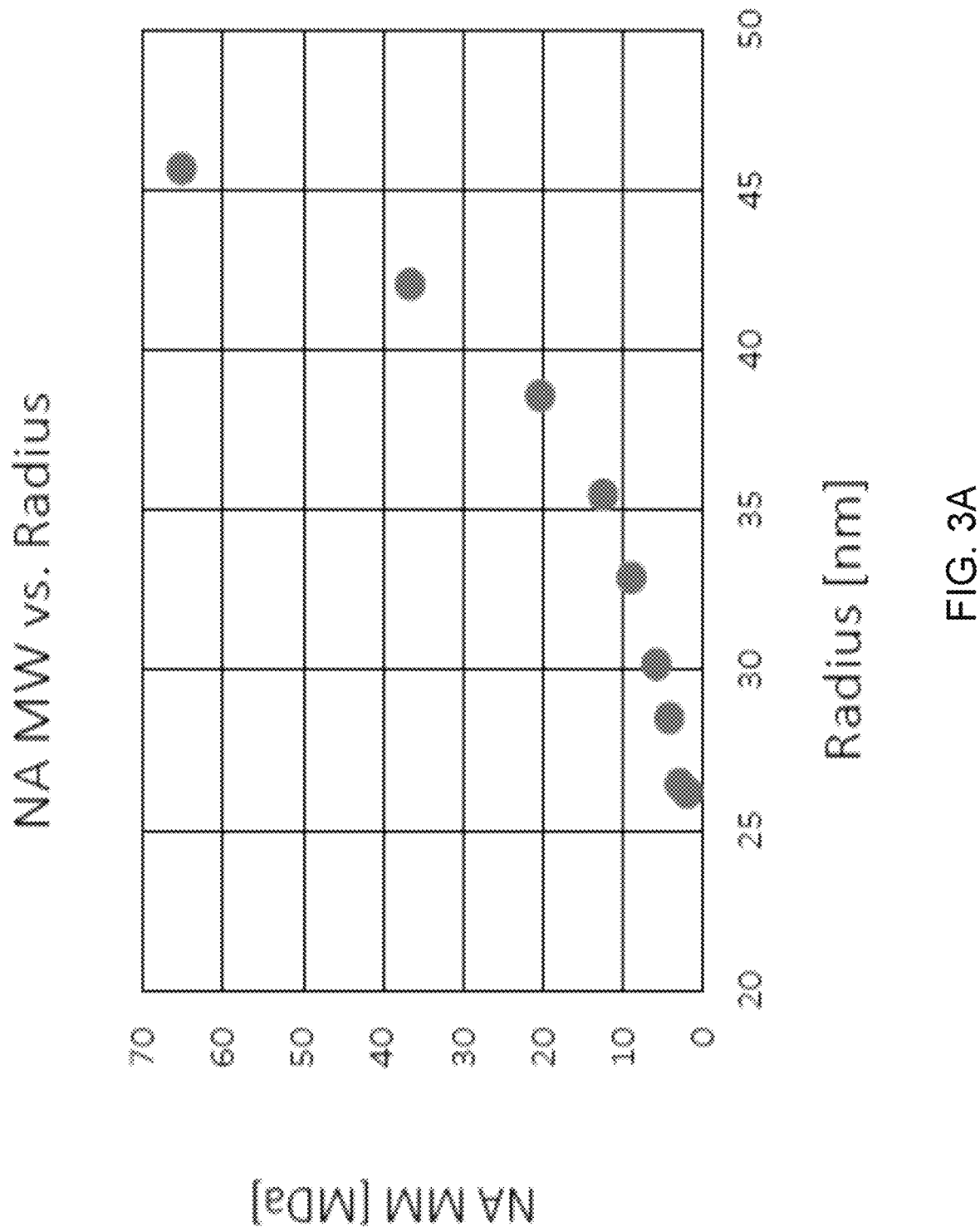
FIG. 3A depicts a graph in accordance with an embodiment.

In a further embodiment, the computer implemented method, the system, and the computer program product further include displaying, by the computer system, on a display the $M_1$ values versus the calculated radii. In an embodiment, the computer implemented method, the system, and the computer program product are configured to perform an operation of displaying, by the computer system, on a display the $M_1$ values versus the calculated radii. In an embodiment, the computer implemented method, the system, and the computer program product further include displaying, by the computer system, on a display the $M_1$ values versus the calculated radii for particles, as depicted in FIG. 3A. FIG. 3A depicts molar mass of nucleic acid (NA) obtained from the LNP analysis plotted against the measured radius of the LNP-NA conjugate using either MALS or DLS detector.

In a further embodiment, the computer implemented method, the system, and the computer program product further include displaying, by the computer system, on a display the $M_1$ values versus total molar mass values, $M_1+M_2$. In an embodiment, the computer implemented method, the system, and the computer program product further include displaying, by the computer system, on a display the $M_1$ values versus total molar mass values, $M_1+M_2$ for macromolecules. In an embodiment, the computer implemented method, the system, and the computer program product are configured to perform an operation of displaying, by the computer system, on a display the $M_1$ values versus total molar mass values, $M_1+M_2$.

In a further embodiment, the computer implemented method, the system, and the computer program product further include (a) dividing, by the computer system, the $M_1$ values corresponding to the calculated radii by the molar mass of one of the wavelength absorbing components, $M_{NA}$, resulting in $M_1/M_{NA}$ values corresponding to the calculated radii, and displaying, by the computer system, on a display the $M_1/M_{NA}$ values versus the calculated radii. In an embodiment, the computer implemented method, the system, and the computer program product are configured to perform an operation of dividing, by the computer system, the $M_1$ values corresponding to the calculated radii by the molar mass of one of the wavelength absorbing components, $M_{NA}$, resulting in $M_1/M_{NA}$ values corresponding to the calculated radii, and an operation of displaying, by the computer system, on a display the $M_1/M_{NA}$ values versus the calculated radii.

Figure 3B:
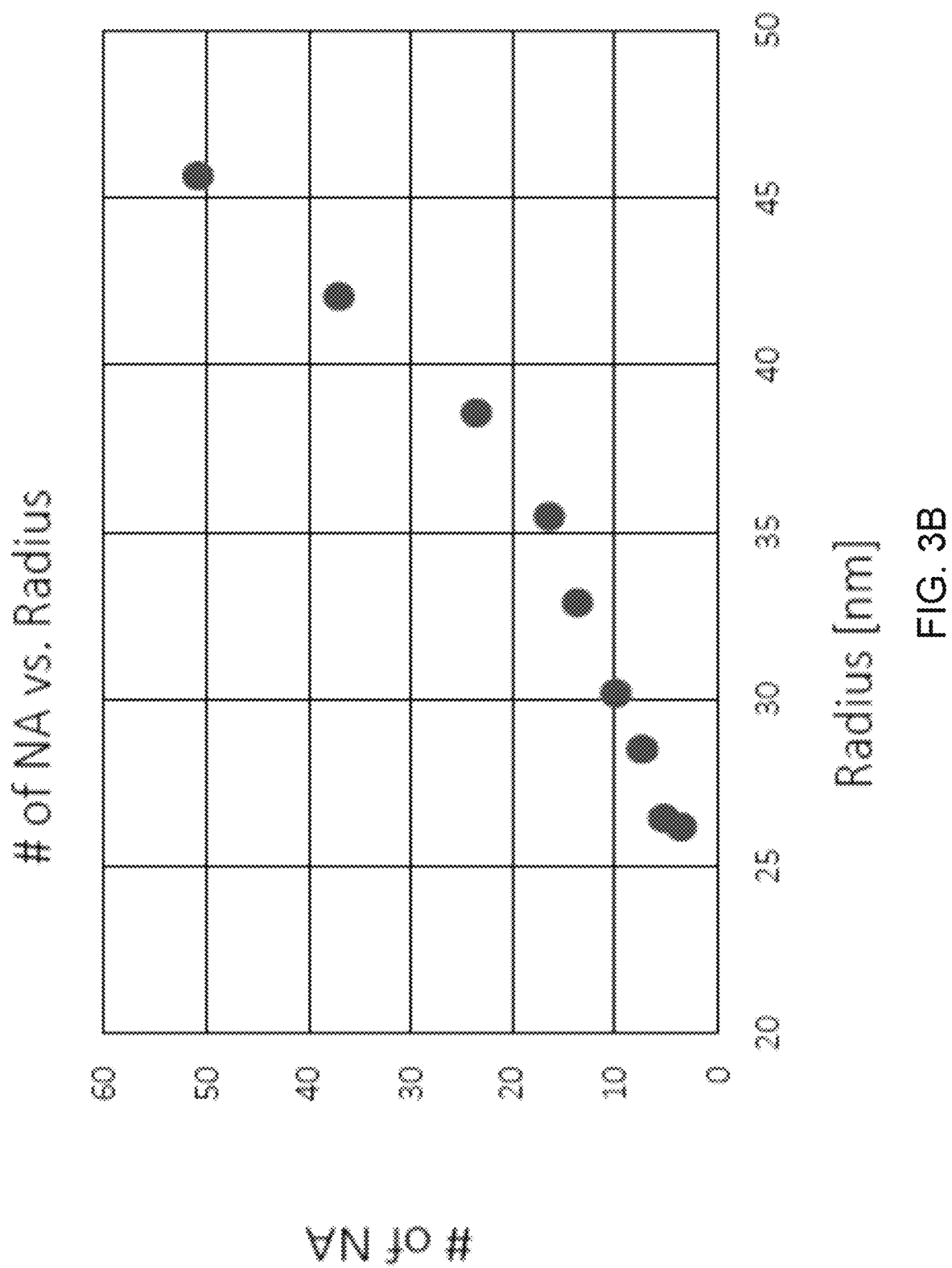
FIG. 3B depicts a graph in accordance with an embodiment.

In an embodiment, the computer implemented method, the system, and the computer program product further include (a) dividing, by the computer system, the $M_1$ values corresponding to the calculated radii by the molar mass of one of the wavelength absorbing components, $M_{NA}$, resulting in $M_1/M_{NA}$ values corresponding to the calculated radii for molecules (e.g., lipid nanoparticles), and (b) displaying, by the computer system, on a display the $M_1/M_{NA}$ values versus the calculated radii for the molecules, as depicted in FIG. 3B. FIG. 3B depicts the number of nucleic acid (NA) derived by dividing the measured NA molar mass by the molar mass of one NA molecule plotted against the measured radius of the LNP-NA conjugate using either MALS or DLS detector.

Displaying Mass Fraction Values

In a further embodiment, the computer implemented method, the system, and the computer program product further include (a) calculating, by the computer system, mass fraction values of the wavelength absorbing components with respect to a total mass of the conjugate molecules/particles, $F_w=M_1/(M_1+M_2)$, corresponding to the calculated radii, and (b) displaying, by the computer system, on a display the calculated $F_w$ values versus the calculated radii. In an embodiment, the computer implemented method, the system, and the computer program product are configured to perform an operation of calculating, by the computer system, mass fraction values of the wavelength absorbing components with respect to a total mass of the conjugate molecules/particles, $F_w=M_1/(M_1+M_2)$, corresponding to the calculated radii, and an operation of displaying, by the computer system, on a display the calculated $F_w$ values versus the calculated radii.

Figure 3C:
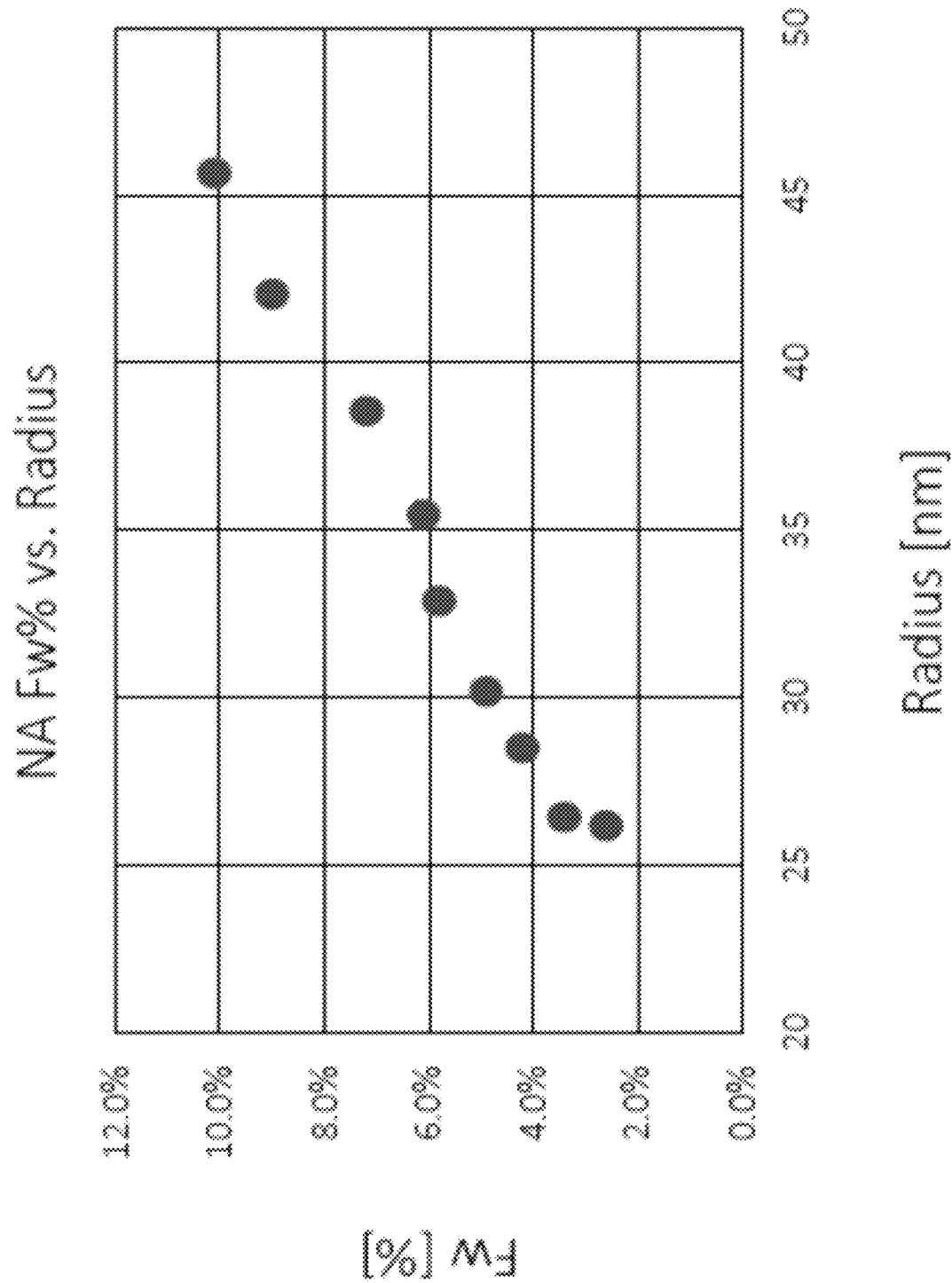
FIG. 3C depicts a graph in accordance with an embodiment.

In an embodiment, the computer implemented method, the system, and the computer program product further include calculating, by the computer system, mass fraction values of the wavelength absorbing components with respect to a total mass of the conjugate molecules/particles, $F_w=M_1/(M_1+M_2)$, corresponding to the calculated radii, and (b) displaying, by the computer system, on a display the calculated $F_w$ values versus the calculated radii for particles, as depicted in FIG. 3C. FIG. 3C depicts nucleic acid (NA) weight fraction, defined as the molar mass ratio of NA to the LNP-NA conjugate, plotted against the measured radius of the conjugate using either MALS or DLS detector.

In a further embodiment, the computer implemented method, the system, and the computer program product further include displaying, by the computer system, on a display the calculated $F_w$ values versus total molar mass values, $M_1+M_2$. In an embodiment, the computer implemented method, the system, and the computer program product are configured to perform an operation of displaying, by the computer system, on a display the calculated $F_w$ values versus total molar mass values, $M_1+M_2$. In an embodiment, the computer implemented method, the system, and the computer program product further include displaying, by the computer system, on a display the calculated $F_w$ values versus total molar mass values, $M_1+M_2$ for macromolecules.

Displaying Density Values

In a further embodiment, the computer implemented method, the system, and the computer program product further include (a) calculating, by the computer system, effective density values of the conjugate molecules/particles, $\rho=(M_1+M_2)/((4 \times R^3 \times \pi)/3)$, corresponding to the calculated radii, and (b) displaying, by the computer system, on a display the calculated $\rho$ values versus the calculated radii. In an embodiment, the computer implemented method, the system, and the computer program product are configured to perform an operation of calculating, by the computer system, effective density values of the conjugate molecules/particles, $\rho=(M_1+M_2)/((4 \times R^3 \times \pi)/3)$, corresponding to the calculated radii, and an operation of displaying, by the computer system, on a display the calculated p values versus the calculated radii.

Figure 3D:
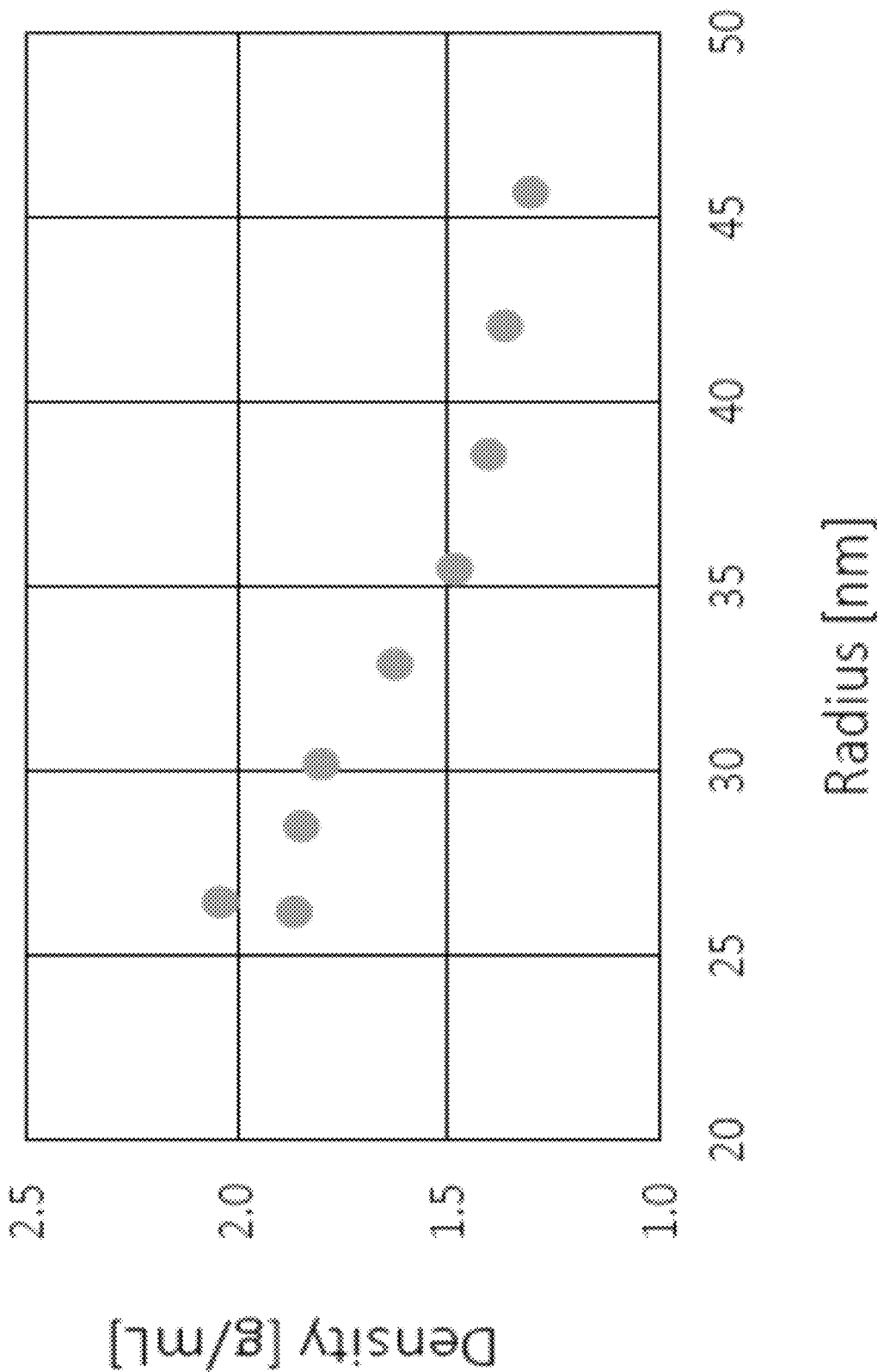
FIG. 3D depicts a graph in accordance with an embodiment.

In an embodiment, the computer implemented method, the system, and the computer program product further include a) calculating, by the computer system, effective density values of the conjugate molecules/particles, $\rho=(M_1+M_2)/((4 \times R^3 \times \pi)/3)$, corresponding to the calculated radii, and (b) displaying, by the computer system, on a display the calculated p values versus the calculated radii for particles, as depicted in FIG. 3D. FIG. 3D depicts density of LNP-NA, calculated from the total molar mass and radius of LNP-NA conjugate, plotted against the measured radius of the LNP-NA conjugate using either MALS or DLS detector.

In a further embodiment, the computer implemented method, the system, and the computer program product further include displaying, by the computer system, on a display the calculated p values versus total molar mass values, $M_1+M_2$. In an embodiment, the computer implemented method, the system, and the computer program product are configured to perform an operation of displaying, by the computer system, on a display the calculated p values versus total molar mass values, $M_1+M_2$. In an embodiment, the computer implemented method, the system, and the computer program product further include displaying, by the computer system, on a display the calculated p values versus total molar mass values, $M_1+M_2$ for macromolecules.

Displaying M1 Values, M2 Values, and [Conj] Values

In a further embodiment, the computer implemented method, the system, and the computer program product further include displaying, by the computer system, on a display the $M_1$ values, the $M_2$ values, and the [conj] values versus elution time. In an embodiment, the computer implemented method, the system, and the computer program product are configured to perform an operation of displaying, by the computer system, on a display the $M_1$ values, the $M_2$ values, and the [conj] values versus elution time.

Figure 4A:
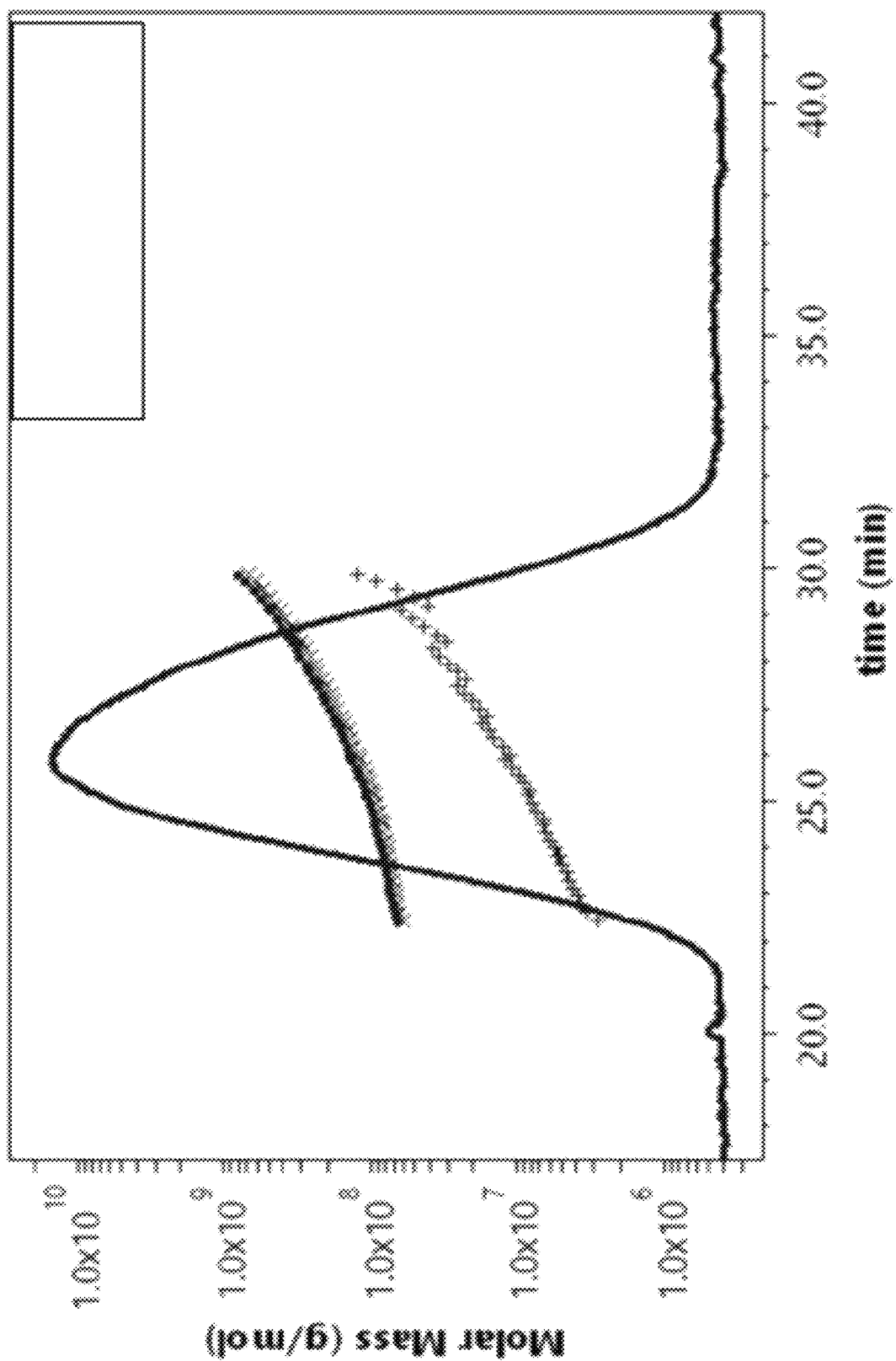
FIG. 4A depicts a graph in accordance with an embodiment.
Figure 4B:
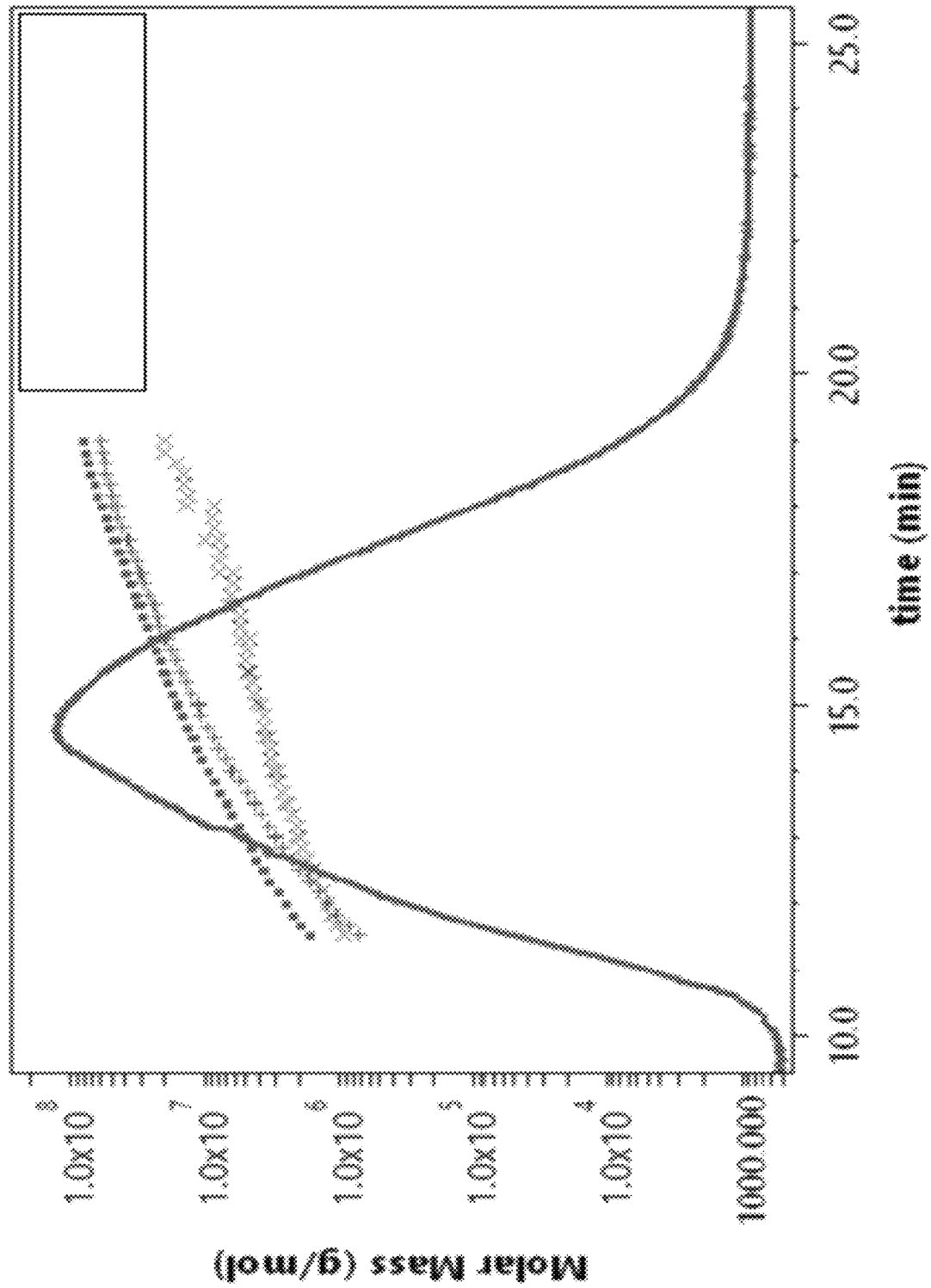
FIG. 4B depicts a graph in accordance with an embodiment.

In an embodiment, the computer implemented method, the system, and the computer program product further include displaying, by the computer system, on a display the $M_1$ values, the $M_2$ values, and the [conj] values versus elution time for particles, as depicted in FIG. 4A. FIG. 4A depicts molar mass of nucleic acid (NA) (+), lipids (x), and NP conjugate (■) obtained from the LNP analysis are plotted against the elution time. In an embodiment, the computer implemented method, the system, and the computer program product further include displaying, by the computer system, on a display the Mt values, the $M_2$ values, and the [conj] values versus elution time for macromolecules, as depicted in FIG. 4B. FIG. 4B depicts Molar mass of protein (x), polysaccharide (+), and conjugate (■) obtained from the LNP analysis are plotted against the elution time.

In an embodiment, the non-wavelength absorbing molecules/particles include the non-wavelength absorbing components of the conjugate molecules/particles. In an embodiment, a range between the lower size limit and the upper size limit of the non-wavelength absorbing molecules/particles comprises at least a range between a lower size limit and a upper size limit of the conjugate molecules/particles. In a particular embodiment, the lower size limit of the non-wavelength absorbing molecules/particles is 20 nm (e.g., 25 nm) and the upper size limit of the non-wavelength absorbing molecules/particles is 200 nm (e.g., 50 nm), where the non-wavelength absorbing molecules/particles comprise lipid nanoparticles. In a particular embodiment, the lower size limit (MW) of the non-wavelength absorbing molecules/particles is $5 \times 10^5$ g/mol (e.g., $2 \times 10^6$ g/mol) and the upper size limit (MW) of the non-wavelength absorbing molecules/particles is $1 \times 10^9$ g/mol (e.g., $1 \times 10^8$ g/mol), where the non-wavelength absorbing molecules/particles comprise polysaccharides.

Figure 5A:
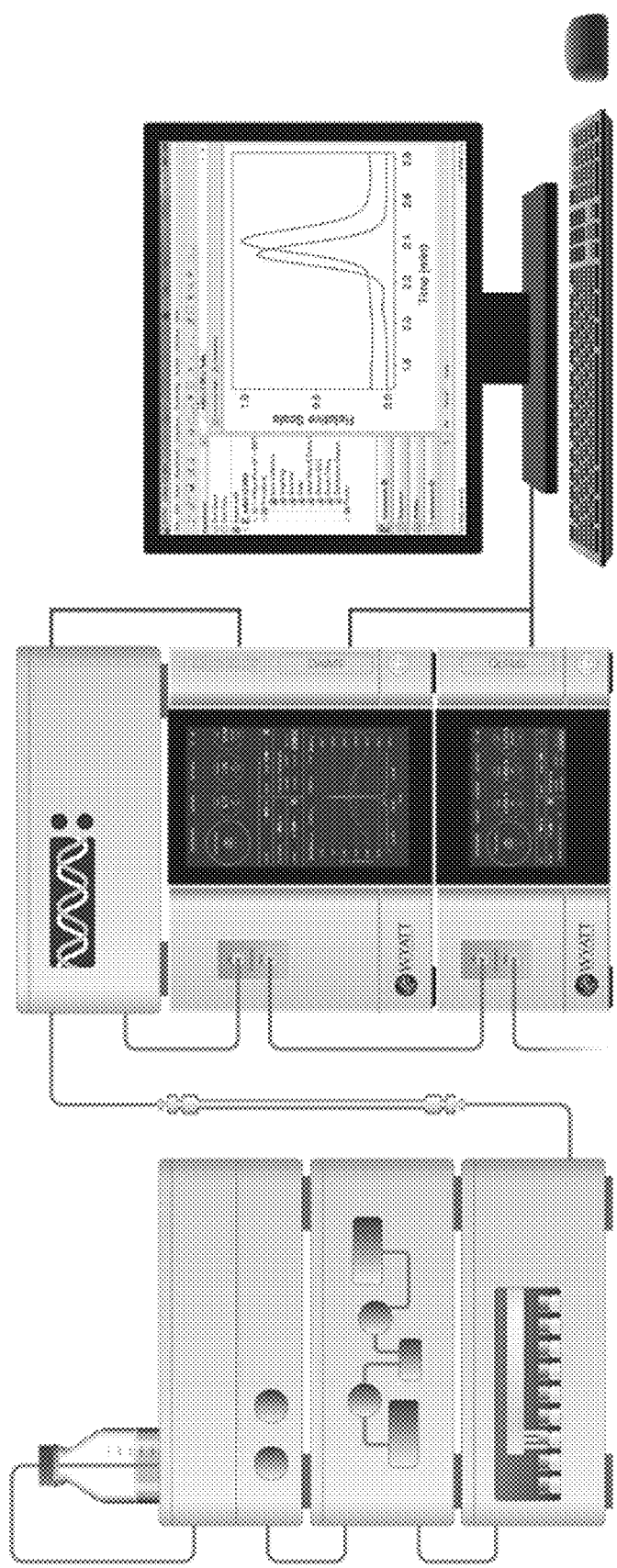
FIG. 5A depicts instruments in accordance with an embodiment.
Figure 5B:
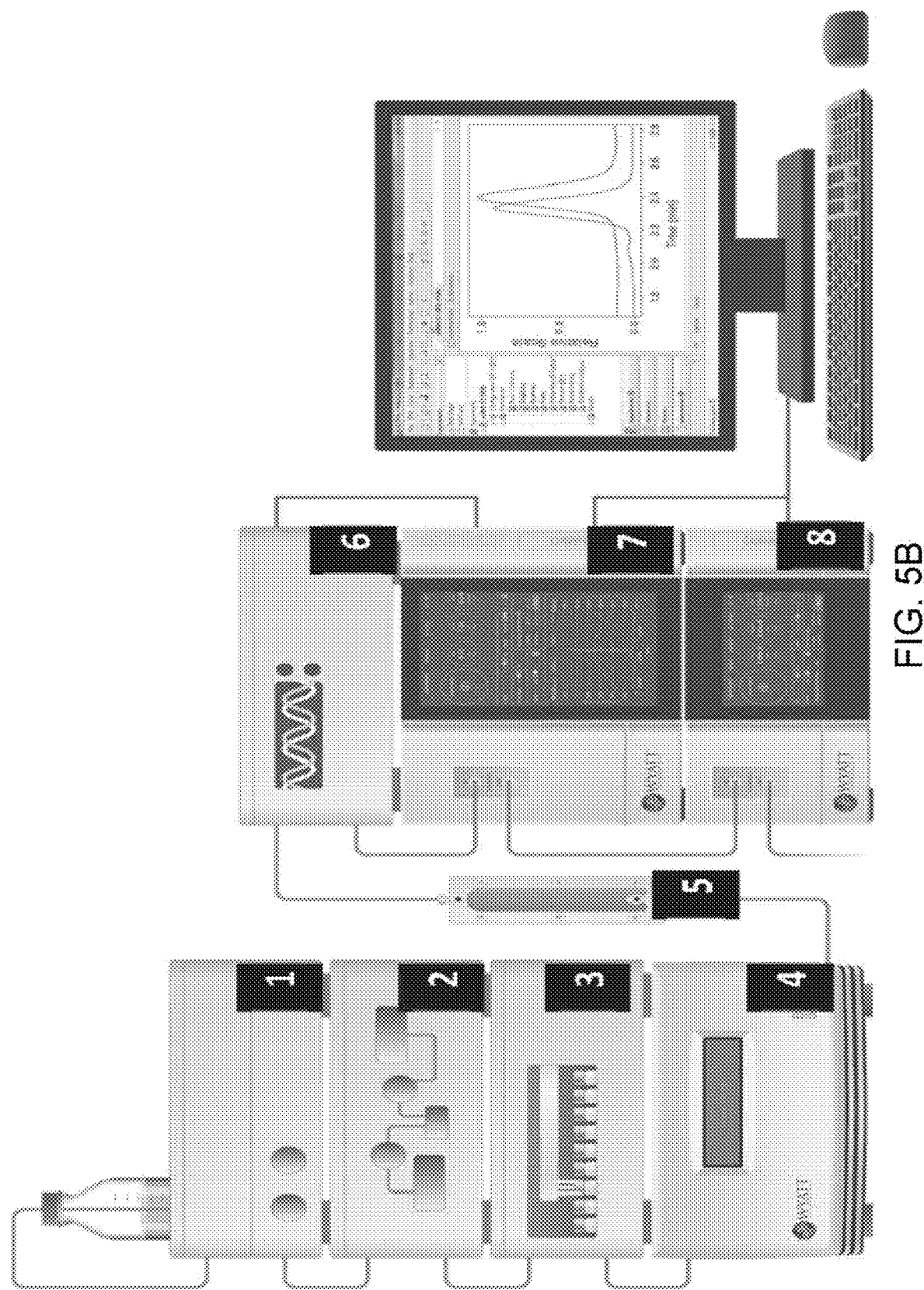
FIG. 5B depicts instruments in accordance with an embodiment.

FIG. 5A depicts a typical SEC system of instruments for the measurements. FIG. 5B depicts a typical FFF system of instruments for the measurements.

Computer System

In an exemplary embodiment, the computer system is a computer system 800 as shown in FIG. 6. Computer system 800 is only one example of a computer system and is not intended to suggest any limitation as to the scope of use or functionality of embodiments of the present invention. Regardless, computer system 800 is capable of being implemented to perform and/or performing any of the functionality/operations of the present invention.

Computer system 800 includes a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 812 may be described in the general context of computer system-executable instructions, such as program modules, being executed by a computer system. Generally, program modules may include routines, programs, objects, components, logic, and/or data structures that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 812 in computer system 800 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions/operations of embodiments of the invention.

Program/utility 840, having a set (at least one) of program modules 842, may be stored in memory 828 by way of example, and not limitation. Exemplary program modules 842 may include an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the present invention.

Computer system/server 812 may also communicate with one or more external devices 814 such as a keyboard, a pointing device, a display 824, one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for using an ultraviolet (UV) light signal to analyze a biological solution, comprising:
    separating, by a separation device, a plurality of conjugate molecules of the biological solution having different sizes from each other;
    analyzing, by a light scattering instrument, each of the separated conjugate molecules, wherein for a molecule of the plurality of conjugate molecules, the method further comprises:
        receiving, by a computer system, $\Delta RI$ values from a differential refractive index (dRI) detector, $\Delta UV$ values from a wavelength absorption (UV) detector, wherein a $\Delta UV$ value of the $\Delta UV$ values includes a change in a UV extinction at a wavelength of the biological solution relative to a pure solvent due to the molecule, and reduced Rayleigh ratio, $R(\theta)$, values from the light scattering instrument, for non-wavelength absorbing molecules/particles of the molecules, wherein the UV extinction includes an absorbance component and a scattering component;
    wherein the non-wavelength absorbing molecules/particles range in size from a lower size limit to an upper size limit and are separated according to size by the separation device;
    calculating, by the computer system, apparent scattering extinction coefficient values of the non-wavelength absorbing molecules/particles, sEC, and molar mass values of the non-wavelength absorbing molecules/particles, M, with respect to the $\Delta RI$ values, the $\Delta UV$ values, and the $R(\theta)$ values;
    executing, by the computer system, a set of logical operations fitting the sEC values and the M values to a fit equation,
        resulting in a correlation between the sEC values and the M values,
            resulting in a fit function, sEC=f(M), for the non-wavelength absorbing molecules/particles, wherein: the correlation and the fit function provide for the removal of the scattering component of the UV extinction; and
    applying, by the light scattering instrument, a corrected UV signal due to the removal of the scattering component of the UV extinction to analyze the each of the separated conjugate molecules.

2. The method of claim 1 wherein the fit equation is one of $$f(M)=(A \times M^2)+(B \times M),$$

$$f(M)=(A \times M)+B, \text{ and}$$

a polynomial of the form $$f(M)=A_0+(A_1 \times M)+(A_2 \times M^2)+(A_3 \times M^3)+ \ldots +(A_n \times M^n),$$

wherein A is a first fit constant relating to the correlation and B is a second fit constant relating to the correlation,
wherein $A_0, A_1, A_2, A_3, \ldots A_n$ are fit constants relating to the correlation.

3. The method of claim 1 further comprising:
    receiving, by the computer system, from a second dRI detector second $\Delta RI$ values for conjugate molecules/particles of the conjugate molecules with respect to a solvent containing the conjugate molecules/particles,
        wherein the conjugate molecules/particles comprise wavelength absorbing components and non-wavelength absorbing components and are separated according to size by a second separation device;
    receiving, by the computer system, from a second wavelength absorption detector second $\Delta UV$ values for the conjugate molecules/particles;
    receiving, by the computer system, from a second SLS instrument second reduced Rayleigh ratio, $R(\theta)$, values with respect to the conjugate molecules/particles and the solvent;
    receiving, by the computer system, a dn/dc value for the wavelength absorbing components, $dn/dc_1$, and a dn/dc value for the non-wavelength absorbing components, $dn/dc_2$, from a dn/dc data source;
    receiving, by the computer system, an absorbing extinction coefficient (aEC) value for the wavelength absorbing components, $\alpha_1$, from an aEC data source;
    receiving, by the computer system, a scattering correction factor value for the wavelength absorbing components, D, from a D data source; and
    executing, by the computer system, a set of logical operations performing conjugate analysis on the second $\Delta RI$ values, the second $\Delta UV$ values, the second $R(\theta)$ values, the $dn/dc_1$ value, the $dn/dc_2$ value, the $\alpha_1$ value, and the D value, with respect to the fit function, sEC-f(M),
        resulting in molar mass values of the wavelength absorbing components, $M_1$, molar mass values of the non-wavelength absorbing components, $M_2$, and molar concentration values of the conjugate molecules/particles.

4. The method of claim 3 wherein the performing conjugate analysis comprises
    executing, by the computer system, a set of logical operations solving conjugate analysis equations in a simultaneous manner with respect to the second $\Delta RI$ values, the second $\Delta UV$ values, the second $R(\theta)$ values, the dn/dc$_1$ value, the dn/dc$_2$ value, the di value, the D value, and the fit function, sEC=f(M),
wherein f(M)=f(M$_1$+M$_2$),
resulting in the M$_1$ values, the M$_2$ values, and the values,
wherein the conjugate analysis equations comprise $$\Delta RI = \left(\frac{dn}{dc_1}\right)c_1 + \left(\frac{dn}{dc_2}\right)c_2,$$

$$\Delta UV = ((\alpha_1 + \varepsilon_1)c_1 + \varepsilon_2 c_2)l,$$

$$\varepsilon_1 = f(M_1 + M_2) \times D,$$

$$\varepsilon_2 = f(M_1 + M_2),$$

$$c_1 = M_1[conj],$$

$$c_2 = M_2[conj], \text{ and}$$

$$R(\theta) = K\left[M_1\left(\frac{dn}{dc_1}\right) + M_2\left(\frac{dn}{dc_2}\right)\right]^2 [conj]P(\theta),$$

wherein
 c$_1$ and ε$_1$, a sEC value, correspond to the wavelength absorbing components,
 c$_2$ and ε$_2$, a sEC value, correspond to the non-wavelength absorbing components,
 l is a path length in the second wavelength absorption detector,
 K is an optical constant of the second SLS instrument with respect to the solvent,
 θ is a scattering angle of a detector in the second SLS instrument, and
 P(θ) is a scattering form factor of the conjugate molecules/particles.

5. The method of claim 3 further comprising:
receiving, by the computer system, from a light scattering (LS) instrument LS measurement values for the conjugate molecules/particles,
 wherein the LS measurement values are one of dynamic light scattering (DLS) measurement values from a DLS instrument and SLS measurement values from the second SLS instrument; and
calculating, by the computer system, radii values (R) of the conjugate molecules/particles with respect to the LS measurement values.

6. The method of claim 5 further comprising:
displaying, by the computer system, on a display the M$_1$ values versus the calculated radii.

7. The method of claim 5 further comprising:
dividing, by the computer system, the M$_1$ values corresponding to the calculated radii by the molar mass of one of the wavelength absorbing components, M$_{NA}$, resulting in M$_1$/M$_{NA}$ values corresponding to the calculated radii; and
displaying, by the computer system, on a display the M$_1$/M$_{NA}$ values versus the calculated radii.

8. The method of claim 5 further comprising:
calculating, by the computer system, mass fraction values of the wavelength absorbing components with respect to a total mass of the conjugate molecules/particles, F$_w$=M$_1$/(M$_1$+M$_2$), corresponding to the calculated radii; and
displaying, by the computer system, on a display the calculated F$_w$ values versus the calculated radii.

9. The method of claim 5 further comprising:
calculating, by the computer system, effective density values of the conjugate molecules/particles, p=(M$_1$+M$_2$)/((4×R$^3$×π/3), corresponding to the calculated radii; and
displaying, by the computer system, on a display the calculated p values versus the calculated radii.

10. The method of claim 3 further comprising:
displaying, by the computer system, on a display the M$_1$ values, the M$_2$ values, and the values versus elution time.

11. The method of claim 3 wherein the non-wavelength absorbing molecules/particles comprise the non-wavelength absorbing components of the conjugate molecules/particles.

12. The method of claim 3 wherein a range between the lower size limit and the upper size limit of the non-wavelength absorbing molecules/particles comprises at least a range between a lower size limit and a upper size limit of the conjugate molecules/particles.

13. The method of claim 12 wherein the lower size limit of the non-wavelength absorbing molecules/particles is 20 nm and the upper size limit of the non-wavelength absorbing molecules/particles is 200 nm,
 wherein the non-wavelength absorbing molecules/particles comprise lipid nanoparticles.

14. The method of claim 12 wherein the lower size limit (MW) of the non-wavelength absorbing molecules/particles is 5×10$^5$ g/mol and the upper size limit (MW) of the non-wavelength absorbing molecules/particles is 1×10$^9$ g/mol
 wherein the non-wavelength absorbing molecules/particles comprise polysaccharides.

15. A method for using an ultraviolet (UV) light signal to analyze a biological solution, comprising:
separating, by a separation device, a plurality of conjugate molecules of the biological solution having different sizes from each other;
analyzing, by a light scattering instrument, each of the separated conjugate molecules, wherein for a molecule of the plurality of conjugate molecules, the method further comprises
receiving, by a computer system, from a differential refractive index (dRI) detector ΔRI values for conjugate molecules/particles with respect to a solvent containing the conjugate molecules/particles,
 wherein the conjugate molecules/particles comprises wavelength absorbing components and non-wavelength absorbing components and are separated according to size by a separation device;
receiving, by the computer system, wavelength absorption detector ΔUV values for the conjugate molecules/particles, wherein a ΔUV value of the ΔUV values includes a change in a UV extinction at a wavelength of the biological solution relative to a pure solvent due to the molecule, wherein the UV extinction includes an absorbance component and a scattering component;
receiving, by the computer system, from a light scattering instrument reduced Rayleigh ratio, R(θ), values with respect to the conjugate molecules/particles and the solvent;
receiving, by the computer system, a dn/dc value for the wavelength absorbing components, dn/dc$_1$, and a dn/dc value for the non-wavelength absorbing components, dn/dc$_2$, from a dn/dc data source;
receiving, by the computer system, an absorbing extinction coefficient (aEC) value for the wavelength absorbing components, α$_1$, from an aEC data source;
receiving, by the computer system, a scattering correction factor value for the wavelength absorbing components, D, from a D data source;

receiving, by the computer system, a fit function, sEC=f(M), for non-wavelength absorbing molecules/particles from a f(M) data source,
   wherein the scattering correction factor value and the fit function provide for the removal of the scattering component of the UV extinction, and
applying, by the light scattering instrument, a corrected UV signal due to the removal of the scattering component of the UV extinction to analyze the each of the separated conjugate molecules,
   wherein the non-wavelength absorbing molecules/particles comprise the non-wavelength absorbing components; and
executing, by the computer system, a set of logical operations performing conjugate analysis on the $\Delta RI$ values, the $\Delta UV$ values, the $R(\theta)$ values, the $dn/dc_1$ value, the $dn/dc_2$ value, the $\alpha_1$ value, and the D value, with respect to the fit function, sEC=f(M),
   resulting in molar mass values of the wavelength absorbing components, $M_1$, molar mass values of the non-wavelength absorbing components, $M_2$, and molar concentration values of the conjugate molecules/particles.

16. The method of claim 15 further comprising:
receiving, by the computer system, from a light scattering (LS) instrument LS measurement values for the conjugate molecules/particles,
   wherein the LS measurement values are one of dynamic light scattering (DLS) measurement values from a DLS instrument and SLS measurement values from the second SLS instrument; and
calculating, by the computer system, radii values of the conjugate molecules/particles with respect to the LS measurement values.

17. The method of claim 16 further comprising:
displaying, by the computer system, on a display the $M_1$ values, the versus the calculated radii.

18. The method of claim 15 further comprising:
displaying, by the computer system, on a display the $M_1$ values, the $M_2$ values, and the values versus elution time.

19. A system for using an ultraviolet (UV) light signal to analyze a biological solution, comprising:
a memory; and
a processor in communication with the memory, the processor configured to perform a method comprising
   receiving $\Delta RI$ values from a differential refractive index (dRI) detector, $\Delta UV$ values from a wavelength absorption (UV) detector, and reduced Rayleigh ratio, $R(\theta)$, values from a static light scattering (SLS) instrument, for non-wavelength absorbing molecules/particles, wherein a $\Delta UV$ value of the $\Delta UV$ values includes a change in a UV extinction at a wavelength of the biological solution relative to a pure solvent due to the molecule, wherein the UV detector separates a plurality of conjugate molecules of the biological solution having different sizes from each other, and the SLS instrument analyzes each of the separated conjugate molecules, wherein the UV extinction includes an absorbance component and a scattering component,
      wherein the non-wavelength absorbing molecules/particles range in size from a lower size limit to an upper size limit and are separated according to size by a separation device, wherein for a molecule of the plurality of conjugate molecules, the processor is configured to perform the method comprising:
   calculating apparent scattering extinction coefficient values of the non-wavelength absorbing molecules/particles, sEC, and molar mass values of the non-wavelength absorbing molecules/particles, M, with respect to the $\Delta RI$ values, the $\Delta UV$ values, and the $R(\theta)$ values,
   executing a set of logical operations fitting the sEC values and the M values to a fit equation,
      resulting in a correlation between the sEC values and the M values,
      resulting in a fit function, sEC=f(M), for the non-wavelength absorbing molecules/particles, wherein the correlation and the fit function provide for the removal of the scattering component of the UV extinction,
   receiving from a second dRI detector second $\Delta RI$ values for conjugate molecules/particles with respect to a solvent containing the conjugate molecules/particles,
      wherein the conjugate molecules/particles comprise wavelength absorbing components and non-wavelength absorbing components and are separated according to size by a second separation device,
   receiving from a second wavelength absorption detector second $\Delta UV$ values for the conjugate molecules/particles,
   receiving from a second SLS instrument second reduced Rayleigh ratio, $R(\theta)$, values with respect to the conjugate molecules/particles and the solvent,
   receiving a dn/dc value for the wavelength absorbing components, $dn/dc_1$, and a dn/dc value for the non-wavelength absorbing components, $dn/dc_2$, from a dn/dc data source,
   receiving an absorbing extinction coefficient (aEC) value for the wavelength absorbing components, $\alpha_1$, from an aEC data source,
   receiving a scattering correction factor value for the wavelength absorbing components, D, from a D data source, and
   executing a set of logical operations performing conjugate analysis on the second $\Delta RI$ values, the second $\Delta UV$ values, the second $R(\theta)$ values, the $dn/dc_1$ value, the $dn/dc_2$ value, the $\alpha_1$ value, and the D value, with respect to the fit function, sEC=f(M),
      resulting in molar mass values of the wavelength absorbing components, $M_1$, molar mass values of the non-wavelength absorbing components, $M_2$, and molar concentration values of the conjugate molecules/particles, and
   providing the scattering correction factor value to the SLS instrument to cause the SLS instrument to apply a corrected UV signal.

20. A computer program product comprising a computer readable storage medium having program instructions embodied therewith, the program instructions executable by a processor to cause the processor to perform a method comprising:
separating, by a separation device, a plurality of conjugate molecules of the biological solution having different sizes from each other;
analyzing, by a light scattering instrument, each of the separated conjugate molecules, wherein for a molecule of the plurality of conjugate molecules, the method further comprises:

receiving ΔRI values from a differential refractive index (dRI) detector, ΔUV values from a wavelength absorption (UV) detector, wherein a ΔUV value of the ΔUV values includes a change in a UV extinction at a wavelength of the biological solution relative to a pure solvent due to the molecule, and reduced Rayleigh ratio, R(θ), values from a static light scattering (SLS) instrument, for non-wavelength absorbing molecules/particles of the molecules, wherein the UV extinction includes an absorbance component and a scattering component;

wherein the non-wavelength absorbing molecules/particles range in size from a lower size limit to an upper size limit and are separated according to size by the separation device;

calculating apparent scattering extinction coefficient values of the non-wavelength absorbing molecules/particles, sEC, and molar mass values of the non-wavelength absorbing molecules/particles, M, with respect to the ΔRI values, the ΔUV values, and the R(θ) values;

executing a set of logical operations fitting the sEC values and the M values to a fit equation,
resulting in a correlation between the sEC values and the M values,
resulting in a fit function, sEC=f(M), for the non-wavelength absorbing molecules/particles;

receiving from a second dRI detector second ΔRI values for conjugate molecules/particles with respect to a solvent containing the conjugate molecules/particles, wherein the conjugate molecules/particles comprise wavelength absorbing components and non-wavelength absorbing components and are separated according to size by a second separation device;

receiving from a second wavelength absorption detector second ΔUV values for the conjugate molecules/particles;

receiving from a second SLS instrument second reduced Rayleigh ratio, R(θ), values with respect to the conjugate molecules/particles and the solvent;

receiving a dn/dc value for the wavelength absorbing components, $dn/dc_1$, and a dn/dc value for the non-wavelength absorbing components, $dn/dc_2$, from a dn/dc data source;

receiving an absorbing extinction coefficient (aEC) value for the wavelength absorbing components, $\alpha_1$, from an aEC data source;

receiving a scattering correction factor value for the wavelength absorbing components, D, from a D data source;

executing a set of logical operations performing conjugate analysis on the second ΔRI values, the second ΔUV values, the second R(θ) values, the $dn/dc_1$ value, the $dn/dc_2$ value, the $\alpha_1$ value, and the D value, with respect to the fit function, sEC=f(M),
resulting in molar mass values of the wavelength absorbing components, $M_1$, molar mass values of the non-wavelength absorbing components, $M_2$, and molar concentration values of the conjugate molecules/particles, and providing the scattering correction factor value to the SLS instrument to cause the SLS instrument to apply a corrected UV signal.

* * * * *